June 24, 1958  B. WETHAMMER  2,840,239
STRAINER AND SPOUT

Filed Sept. 6, 1955  2 Sheets-Sheet 1

INVENTOR
*Bert Wethammer*

BY [signature]

ATTORNEY

June 24, 1958     B. WETHAMMER     2,840,239
STRAINER AND SPOUT

Filed Sept. 6, 1955     2 Sheets-Sheet 2

INVENTOR
Bert Wethammer
BY Robert M. Bunning
ATTORNEY

United States Patent Office 2,840,239
Patented June 24, 1958

2,840,239
STRAINER AND SPOUT
Bert Wethammer, St. Paul, Minn.

Application September 6, 1955, Serial No. 532,643

7 Claims. (Cl. 210—467)

This invention relates to an improvement in strainer and pouring spout and deals particularly with an apparatus for separating liquids from solid material.

In various fields it is desirable to separate liquids from solids by the removal of one from the other. For example, cherries, apples and other fruits are shipped in standard size cans or pails and include juices as well as the fruit. When using this fruit in baking, it is usually desired to separate the fruit from the juice so that both the solids and the juices may be properly prepared. As the fruit usually floats upon the surface of the juices, considerable difficulty is often experienced in this operation.

An object of the present invention resides in the provision of a cover which may be used on a pail containing solids and liquids and which includes a pouring spout. Adjoining the pouring spout is a strainer element which extends into the can or pail to a point spaced from the lower end thereof. As the can or pail bearing the cover is tilted, the juices will flow through the strainer element and over the pouring spout and into a suitable receptacle. Thus the separation of the fruit from the juices may be accomplished in an extremely short period of time.

A feature of the present invention resides in the provision of an elongated strainer element which includes a foraminous body which is preferably trough-shaped in cross section and which is supported upon the cover with its open side directed toward the wall of the can. The open side of this trough-shaped strainer member is closed by a suitable closure plate. As a result the strainer is located close to a wall of the can or pail so that virtually all of the liquid may be separated from the solids.

A further feature of the present invention resides in the fact that the foraminous portion of the strainer element is provided with a peripheral flange and the closure plate includes a marginal channel designed to slidably accommodate this flange. As a result the closure plate may be removed from the foraminous member for cleaning and sterilizing.

A further feature of the present invention resides in the fact that the side edges of the closure member extend in close proximity with the walls of the can or pail so that little, if any, of the solid material will pass between the edges of the strainer element and the walls of the can or pail. The closure member is preferably provided with at least one aperture or notch near its upper end to permit liquid between the strainer element and the wall of the can to escape.

While in the present description the device is described as particularly useful in separating juice from fruit, obviously the device is capable of many other uses not specifically described.

These and other objects and novel features of my invention will be more clearly and fully set forth in the following specification and claims.

In the drawings forming a part of the specification:

Figure 4 is a bottom perspective view of the cover and strainer showing the strainer element closure member partially removed.

Figure 1:
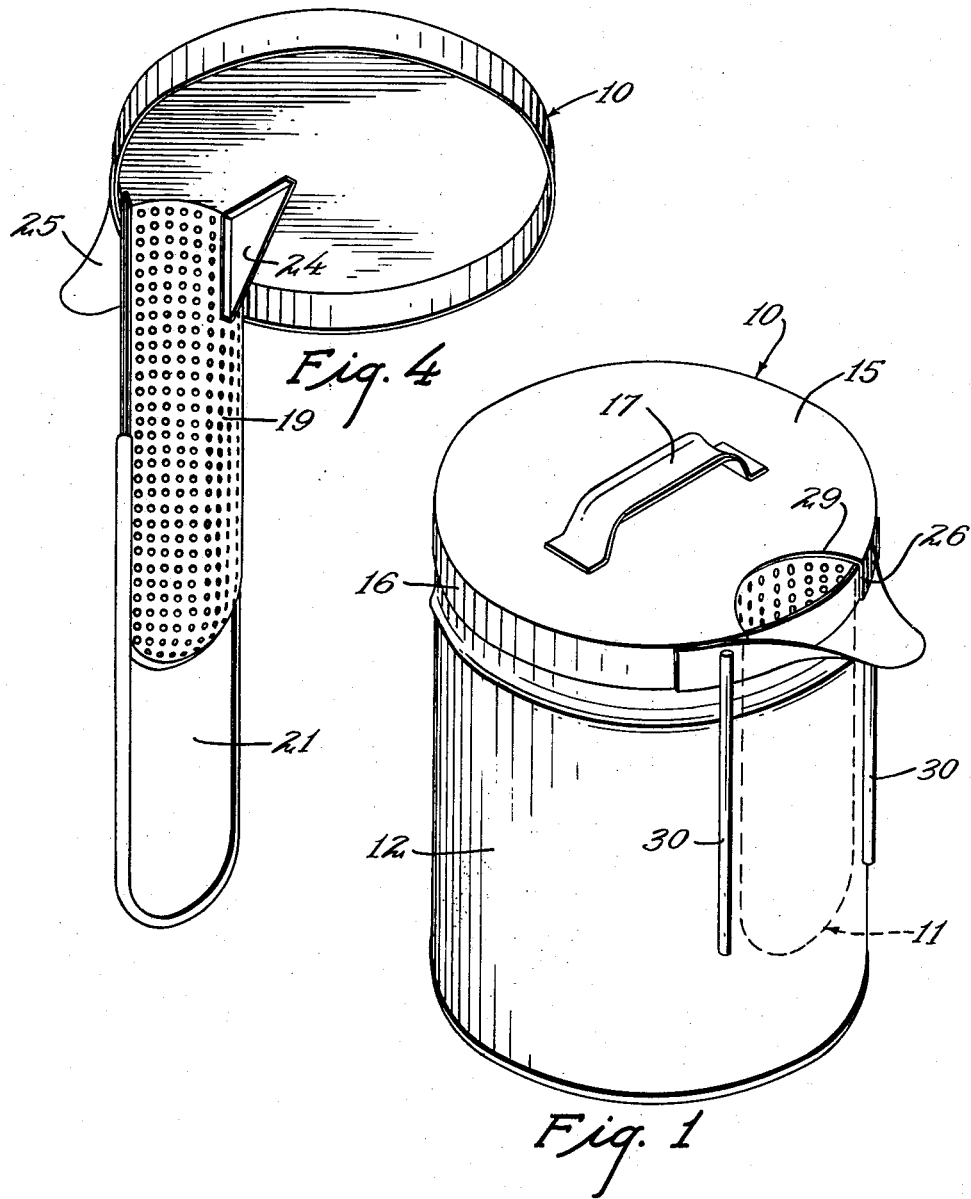
Figure 1 is a perspective view of the apparatus in place upon a pail or can.

In general the apparatus includes a cover 10 to which is secured a strainer element 11. The cover is designed to fit upon a can or pail 12 of the type used to contain combined liquid and solid materials.

The pail 12 is shown as including a bottom closure 13 and generally cylindrical body portion 14 connected to the bottom 13 and extend upwardly therefrom. The upper end of the pail 12 is open.

The cover element 10 includes a top closure plate 15 having a peripheral downwardly extending skirt or flange 16 designed to telescope upon the top of the pail 12. The cover 16 fits snugly upon the can or pail and preferably frictionally engages the upper end thereof.

The closure plate 15 is normally provided with a handle 17 of suitable type by means of which the entire device may be handled. The handle 17 is spaced from the parts of the device which come in contact with the fruit or fruit juices for sanitary reasons.

Figure 3:
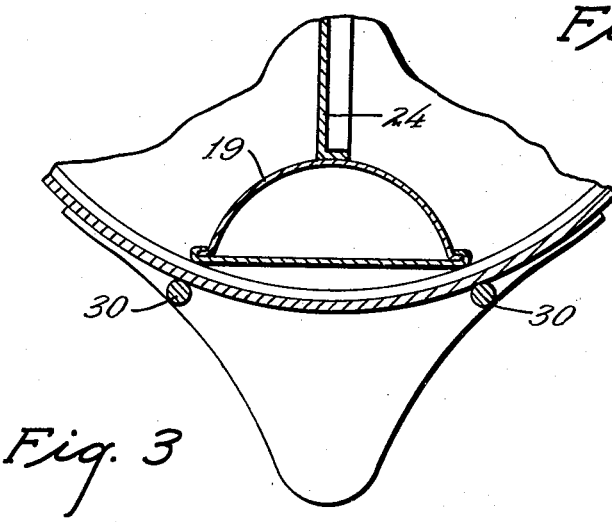
Figure 3 is an enlarged sectional view through the pail just below the pouring spout, the position of the section being indicated by the line 3—3 of Figure 2.

The strainer element 11 preferably includes a foraminous sheet of metal or other suitable material and is usually arcuate in cross section as indicated in Figure 3 of the drawings. The lower end of the foraminous member 19 is bent inwardly to the plane of the edges of the plate and the edges including the lower curved edge of the plate 19 are provided with a peripheral flange 20 all portions of which are on a common plane.

A closure plate 21 is provided which is preferably flat and which is shaped similarly in outline to the outline of the flange 20. The edges of the plate 21 are bent reversely to provide a channel-shaped flange 22 extending on opposite sides and along the bottom of the plate 21. This flange 22 is arranged to slidably accommodate the flange 20 of the trough-shaped plate 19. The upper end of the plate 21 is provided with a central notch 23.

Figure 2:
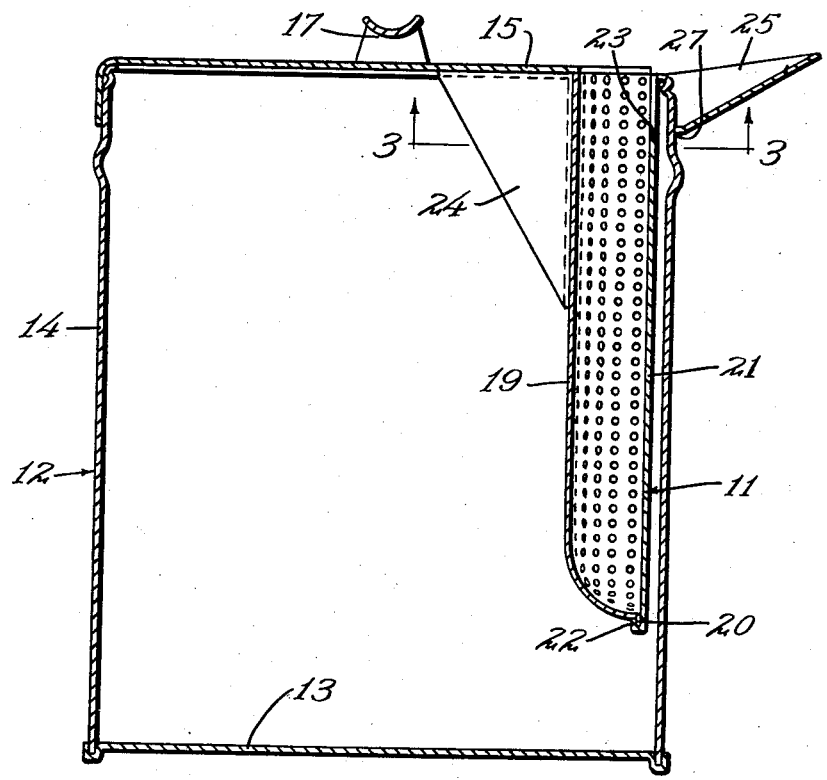
Figure 2 is a sectional view through the apparatus and the can or pail showing the arrangement of parts.

A gusset plate 24 is secured to the under surface of the closure plate 15 and is centrally secured to the foraminous plate 19 at the center thereof to extend longitudinally thereof. This gusset plate holds the strainer element 11 in right angular relation to the plate 15 of the cover 10. A pouring spout 25 is secured to the flange 16 of the cover member 10 and a portion of the flange 16 is cut away as indicated at 26 adjoining the pouring spout. The inner edge 27 of the pouring spout is designed to frictionally engage against the cylindrical wall 14 of the can or pail 12 as indicated in Figure 2 of the drawings. The upper end of the trough-shaped foraminous plate 19 is secured to the under surface of the plate 15 and the plate 15 is notched away as indicated at 29 substantially even with the inner surface of the plate 19 so that the trough-shaped strainer element is open at its upper end. This permits the liquid to be poured over the edge of the pail 12 and be guided by the spout 25 into a suitable receptacle. The flange 16 may be of any suitable length and may overlie a predetermined amount of the wall 14 of the can 12. In the particular form illustrated the flange 16 is relatively short and fits only over the upper portion of the can or pail. In order to guide the strainer element 11 down the wall of the pail as the strainer is inserted into the pail, guide rods 30 may be provided attached to the flange 16 or spout 25 to extend downwardly over the outer surface of the wall 14. These guide rods are useful in preventing solid material from passing between the closure plate 21 of the strainer element and the wall of the pail as the strainer is inserted.

The operation of the apparatus is believed obvious. The strainer element 11 is inserted into the open topped pail along an edge or wall of the pail, the rods 30 guiding this movement. When the strainer element is sufficiently inserted, the flange 16 of the cover 10 telescopes over the top of the pail, the pail passing between the inner edge 27 of the pouring spout 25 and the strainer element. The pail is then lifted and the liquid is strained from the solids and flows over the pail edge into a suitable receptacle. All of the liquid must pass through the apertures in the foraminous channel-shaped plate 19 with the exception of liquid flowing between the edges of the strainer element and the can walls. This space is too narrow to admit the fruit or other solid material so that an effective straining is provided.

When the liquid has been separated from the solids the cover is lifted from the pail and the strainer element withdrawn from the interior thereof. The entire device may then be cleaned and sterilized by removing the slidably supported closure plate 21 so that all of the surfaces of the structure are readily accessible.

In accordance with the patent statutes, I have described the principles of construction and operation of my strainer and pouring spout device, and while I have endeavored to set forth the best embodiment thereof, I desired to have it understood that changes may be made within the scope of the following claims without departing from the spirit of my invention.

I claim:

1. A combined strainer and spout device for use in conjunction with open topped pails, the structure comprising a pail cover, a trough-shaped strainer member extending downwardly from said cover near an edge thereof, the open side of the trough-shaped strainer member being directed outwardly from the axis of the cover, a closure member marginally secured to said trough-shaped strainer member, and a spout member secured to said cover outwardly of said strainer member, said cover having an opening therethrough in registry with said trough-shaped strainer member.

2. The construction described in claim 1 and in which said closure member is slidably engaged with the marginal edges of said strainer member.

3. The construction described in claim 1 and in which the closure member includes a flanged edge which is on the plane of the edges of the trough-shaped member.

4. A device for separating liquid and solids contained in an open topped pail, said device including a cover for the pail, a strainer element secured to said cover and extending downwardly therefrom, said strainer member comprising a trough-shaped foraminous body, a rounded lower end on said trough-shaped body, a marginal flange extending continuously along the sides and bottom of said trough-shaped body, all portions of which are on a common plane, a closure element including a peripheral flange similarly shaped to the flange of said foraminous body and enclosing this first flange, said cover having an opening therein in registry with said strainer member.

5. The construction described in claim 4 and including a member extending from said cover to said strainer member to hold the same in right angular relation to said cover.

6. The construction described in claim 4 and including a pouring spout on said cover positioned radially outwardly of said strainer member.

7. The construction described in claim 4 and including guide means extending over a portion of the outer surface of the pail when placed thereupon to hold the side edges of said strainer element adjacent to the wall of the pail.

References Cited in the file of this patent

UNITED STATES PATENTS

| 691,052 | Freeman | Jan. 14, 1902 |
| 2,055,096 | Dehn et al. | Sept. 22, 1936 |
| 2,258,524 | Vigurs | Oct. 7, 1941 |